April 8, 1958 — A. J. ABS — 2,829,443
INCLINATION AND DIRECTIONAL RECORDER
Filed April 25, 1955 — 3 Sheets-Sheet 1
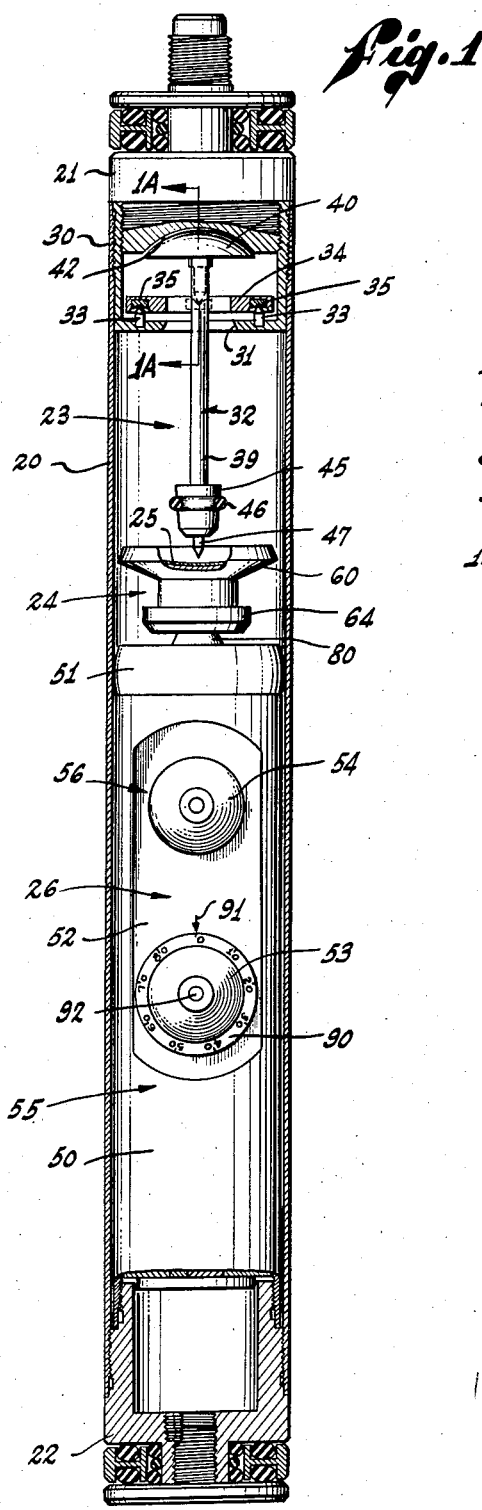
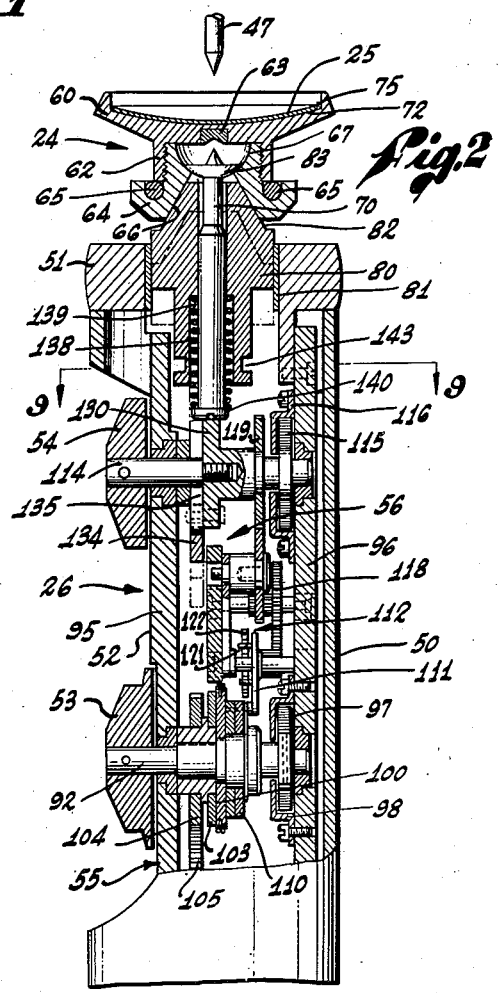
INVENTOR.
ALFRED J. ABS
BY Fulwider Mattingly & Huntley
Attorneys

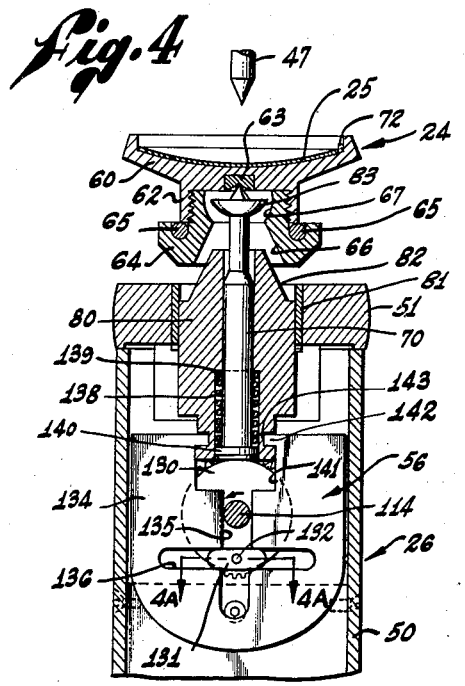
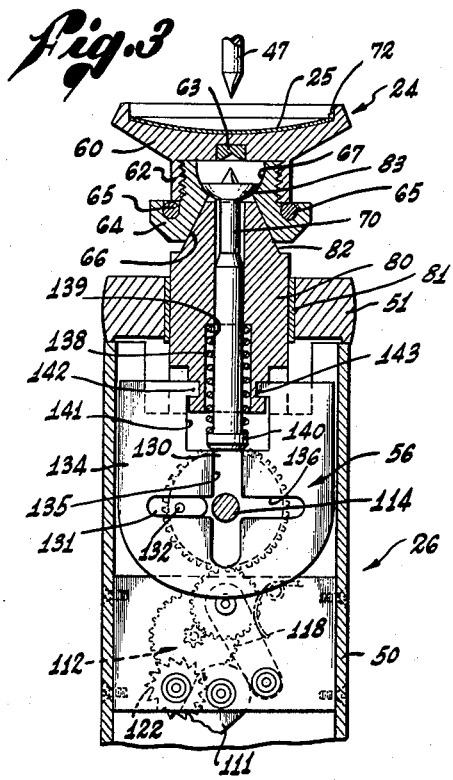
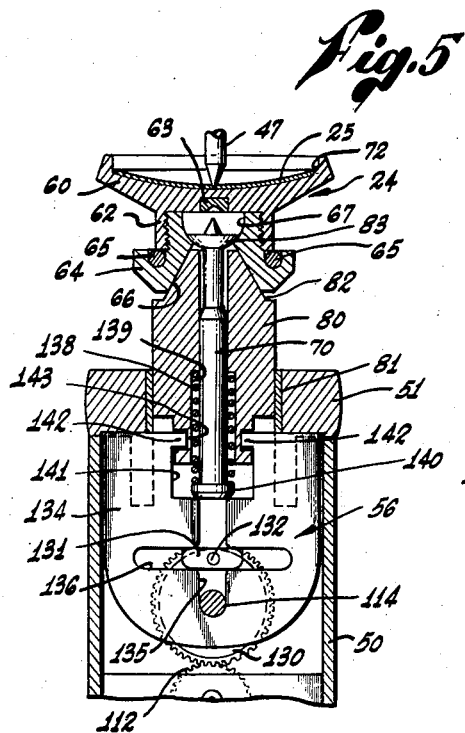
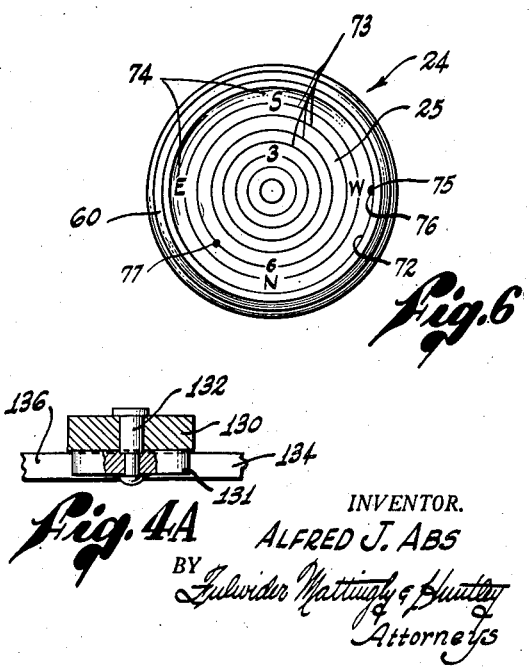
INVENTOR.
ALFRED J. ABS

April 8, 1958  A. J. ABS  2,829,443
INCLINATION AND DIRECTIONAL RECORDER
Filed April 25, 1955  3 Sheets-Sheet 3

INVENTOR.
ALFRED J. ABS
BY Gulwider Mattingly & Huntley
Attorneys

United States Patent Office 2,829,443
Patented Apr. 8, 1958

2,829,443

INCLINATION AND DIRECTIONAL RECORDER

Alfred J. Abs, Los Angeles, Calif., assignor to Technical Oil Tool Corporation, Ltd., Los Angeles, Calif., a corporation of California Application April 25, 1955, Serial No. 503,627

16 Claims. (Cl. 33—205.5)

This invention relates generally to well survey instruments and more particularly to an improved form of recording instrument for determining the inclination and azimuthal direction of a well bore.

In the well drilling art it is necessary to make frequent determinations of the orientation of a well bore. Where offset or slant drilling is required it is necessary to determine the inclination of the bore relative to a vertical axis, and the direction of the bore in azimuth, in order that the bottom of the bore may be properly located. To obtain such information it is necessary to lower or drop a recording instrument within the well bore, allow it to come to rest at the bottom of the well and record, and then recover it from the well. Because of the increased speed of descent, and simplicity of operation, the method of dropping the instrument in the well bore is highly favored over methods employing wire lines or cables. While the instrument may be encased within a protective shell or "go-devil" it can be appreciated that the internal mechanisms are subjected to extreme shock conditions during descent and upon being arrested at the bottom of the bore.

It is therefore desirable to provide a self-contained instrument which is of durable mechanical construction and which provides protection for all of the delicate indicating assemblies contained therein. At the same time, the instrument should be capable of providing a positively marked record which is preferably a single chart of direct reading type containing all of the desired information as to both inclination and azimuthal direction.

In order to obtain an indication of the heading or azimuthal direction in which the well bore is oriented it is conventional to provide some form of magnetic compass means within the instrument. Such a magnetic means is capable of exerting only a very small orienting torque and must be supported by a very delicate and frictionless type of pivot. Damage to the pivot support totally destroys the accuracy of the readings taken and renders the instrument completely useless. The provision of a durable and yet accurate pivot support for the compass means is thus one of the major problems in this kind of instrument.

With the foregoing in mind, the present invention has two major objects, the provision of an improved and simplified form of inclination and directional recorder, and the provision of an operating assembly which gives protection to the pivotal support for an indicating assembly provided in the recorder.

Another object of the invention is to provide a recorder of the character described having an indicating head adapted to carry a chart and to be oriented in azimuth by magnetic means, together with means for moving the head into positive engagement with a pendulum marker for producing a single direct reading chart.

It is also an object of the invention to provide pivot support means for an indicating head having a holding member movable relative to the pivot for engaging and disengaging with the head so that the pivot is only supporting the head during the time of recording and cannot be damaged when the instrument is being moved.

A further object of the invention is to provide time-controlled operating means for actuating the pivot support means and for moving the indicating head into engagement with a marking pendulum.

Still another object of the invention is to provide mechanism of the character described which is of simple and durable construction to give long and trouble-free service.

These and other objects and advantages of the invention will become apparent from the following detailed description of a preferred embodiment thereof and from an inspection of the accompanying drawings in which:

Figure 1 is a longitudinal section of a preferred form of the directional inclination recorder;

Figure 1A is a sectional detail taken along the line 1A—1A of Figure 1;

Figure 2 is a partial longitudinal section of the operating assembly taken at right angles to Figure 1;

Figures 3, 4 and 5 are partial sectional views of the indicating head and operating means showing the initial, intermediate, and marking positions of the various elements;

Figure 4A is a sectional detail taken along the line 4A—4A of Figure 4;

Figure 6 is a plan view of the indicating head and record chart;

Figure 7:
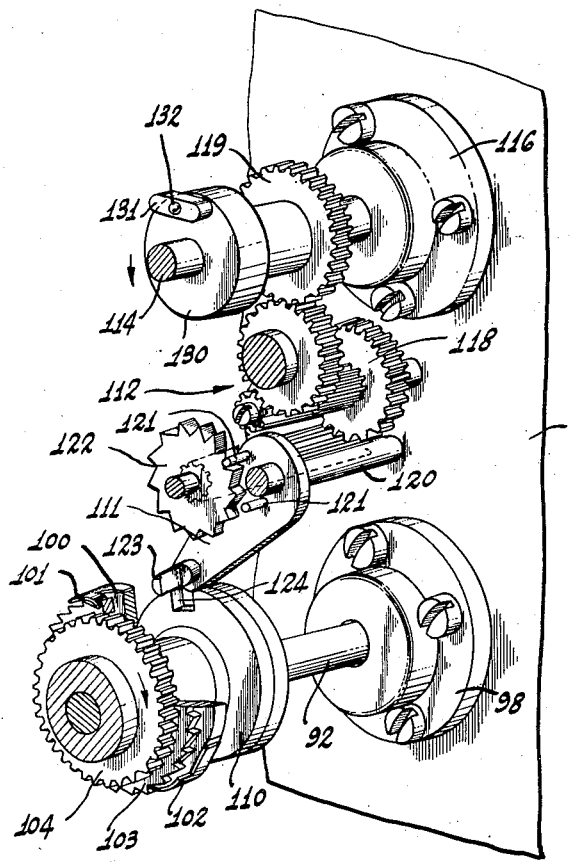
Figure 7 is an enlarged perspective detail of the operating and release means.
Figure 8:
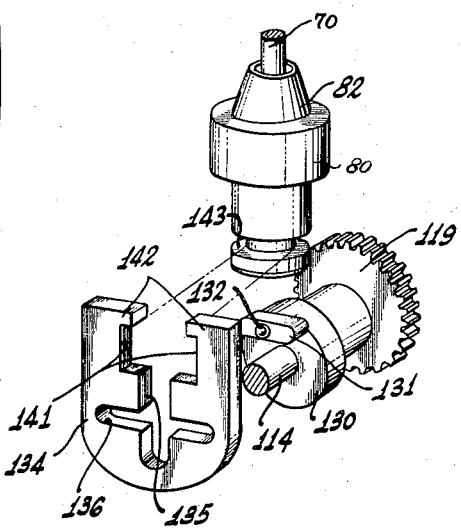
Figure 8 is an exploded view showing the relationship of the pivot shaft, holding sleeve, operating yoke and cam.
Figure 9:
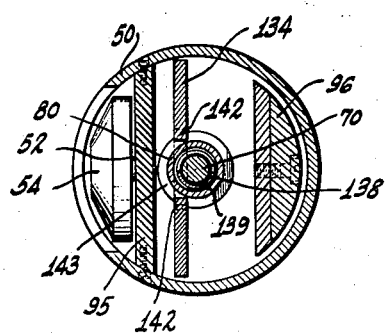
Figure 9 is a cross section taken along the line 9—9 of Figure 2.

Referring now to the drawings and particularly to Figure 1 thereof, the numeral 20 designates an elongated tubular housing which contains all of the operating elements of the preferred form of instrument. Housing 20 is closed at its upper end by a cap 21 which is threadedly and removably engaged therein and at its lower end by a base member 22 which is similarly engaged. The entire instrument is designed to be placed within an outer protective shell (not shown), and to be dropped or lowered within the well bore so that housing 20 is positioned in alignment with the axis of the well bore.

In the upper portion of housing 20 is a pendulum indicating and marking assembly designated generally at 23 which is adapted to maintain itself in an upright or vertical position. Just below the pendulum assembly 23 is an indicating head 24 adapted to carry a chart 25 and to be oriented by compass means provided therein. The indicating head 24 is supported on the upper end of an operating assembly designated generally at 26. This assembly contains a time-controlled mechanism adapted to support and release indicating head 24, and to move the latter into engagement with the pendulum assembly 23 for marking chart 25 with a record of both the inclination and directional azimuth of the well bore. Subsequent to its engagement with the pendulum assembly 23, indicating head 24 is withdrawn to a secured position in which it remains while the instrument is withdrawn from the well bore.

Considering the mechanism in more detail, it is seen that pendulum and marking assembly 23 is formed with an upper support cage 30 having a cylindrical outer wall which is threadedly hung from cap 21 and is joined to a partial bottom wall that has a central opening 31 defined therein. A central pendulum 32 projects downwardly through opening 31, and is supported on cage 30 by means of a modified gimbal type of suspension employing a 4-point pivot mounting so that pendulum is free for limited but universal inclining movement relative to housing 20. To this end, a pair of upstanding pivots 33 are positioned on the bottom wall of cage 30 to support a centrally open tilting plate or ring 34 which has on the bottom surface a pair of downwardly facing seats 35 shaped to rest upon the pivots. It will be understood that plate 34 is free to tilt or rotate about a horizontal axis extending across the tips of pivots 33.

As is best seen in Figure 1A, a pair of upwardly facing seats 36 are provided on the top ring 34 at right angles to seats 35, and these are adapted to support a pair of depending pivots 37 which are mounted upon pendulum 32. In the construction shown, pendulum 32 has an elongated shaft 39 formed with an upper semi-spherical head 40 which carries a pair of outer bosses 41 adapted to receive pivots 37. Head 40 has limited clearance within a complemental concave recess 42 formed within cap 21 so that it cannot be jarred or lifted upwardly to move the suspension pivots off of their respective seats. Pendulum 32 is free for limited pivotal movement relative to ring 34 about a horizontal axis extended through the tips of pivots 37, and since ring 34 has freedom of movement about the horizontal axis at right angles thereto, pendulum 32 has the desired universal freedom for inclining motion.

The lower end of pendulum shaft 39 carries a weighted enlarged boss 45 to give a proper balance and stability, and this may be provided with a resilient buffer ring 46 that is adapted for shock deadening engagement with housing 20 in the event the pendulum swings or oscillates excessively during the travel of the instrument through the well bore. On the lower end of pendulum 32 is a sharply pointed marking pin 47 for making a proper record upon the chart 25 upon engagement therewith. While the pendulum has been described as inclining relative to housing 20, it will be understood that in use the pendulum merely stands vertically while housing 20 is inclined in accordance with the inclination of the well bore. This relative movement offsets indicating head 24 to one side or the other of marking pin 47 and the mark made thereby is thus representative of the inclination of the well bore from a vertical axis. As will later be described, indicating head 24 is rotatably oriented or turned in the direction of the magnetic north pole, and the mark made by pin 47 thus also indicates the azimuthal direction in which the well bore is inclined.

Operating assembly 26 is formed with a cylindrical case 50 which is threadedly connected to base member 22 for support thereon and fits slidably within housing 20. A circular flange 51 is mounted at the upper end of case 50 and projects slightly to bear against the wall of housing 20 and center the upper end of the case accurately therewithin. Extending longitudinally along the front of case 50 is a recessed portion which exposes a flat front panel 52 that is set back to provide mounting space for control knobs 53 and 54. The lower knob 53 is a winding and setting knob for a timing mechanism 55 mounted within the lower portion of case 50, and knob 54 is a setting and winding knob for an operating means 56 mounted within the upper portion of the case. The timing means 55 and operating means 56 cooperate together to control the release and movement of indicating head 24 in a manner as will later be described in detail.

As will be remembered, indicating head 24 supports a chart 25 below marking pin 47. To this end, head 24 is formed with an upper cup-shaped holder 60 which carries a lower depending boss 62 surrounding a downwardly facing hardened pivot seat 63. Boss 62 is internally threaded and is engaged with a lower weighted skirt 64 which flanges outwardly and supports a pair of spaced parallel bar magnets 65. On the bottom of skirt 64 is a central conically shaped seat 66, and on the upper central surface is a semi-spherical socket 67.

In order to pivotally support head 24, a central upstanding pivot 70 is mounted within case 50. Pivot 70 has an upper pointed tip which is adapted to engage in seat 63 to support head 24 for free rotation. When so supported, head 24 is rotatably turned by magnets 65 so that the latter point toward the magnetic north pole. Chart 25 may therefore be referenced to the magnetic North, so that the record made thereon indicates both the inclination of the well bore from the vertical and the azimuthal direction or heading of the well.

Chart 25 is formed of paper or soft metal for taking an impression from marking pin 47, and is removably pressed into a shallow concave seat 72 formed in the upper face of holder 60. The curvature of seat 72 corresponds to the arc which marking pin 47 makes in swinging about the pivot center of pendulum assembly 23 so that the normal spacing of the pin from chart 25 remains the same for all relatively inclined positions of the head 24, and pendulum assembly 23. As is best seen in Figure 6, chart 25 is of circular shape and fits concentrically within holder 60. On the upper face of chart 25 are a set of concentric rings 73 which indicate degrees of inclination and a reversed compass rose 74. The latter is reversely marked to make the chart a direct reading chart of the direction in which the well bore is heading away from the vertical, for it can be seen upon reflection that marking pin 47 tends to swing to the opposite or low side of chart 25 as the latter is inclined relatively upwardly in accordance with the direction of heading of the well bore.

When head 24 is supported for free rotation upon pivot 70, magnets 65 swing the head so that they are pointed towards the magnetic North Pole. Since chart 25 functions as a compass card it is necessary that the chart be positioned in holder 60 with the markings of the compass rose in alignment with the bar magnets. The holder 60 is therefore provided with a small indexing pin 75 which fits within a preformed recess 76 in the edge of chart 25 and as each chart is placed in the holder it may thus be properly indexed relative to the holder.

Also shown upon chart 25 is a representative mark 77 which is the kind of record that will be made upon the chart when it is engaged by marking pin 47. As illustrated herein, the mark 77 shows that the well bore is inclined from the vertical through an angle of 6°, and that the well has a North East heading. The heading of the well bore as shown is, of course, a magnetic heading, but this can easily be converted to a true heading by applying the local deviation to the reading. The single mark 77 therefore provides a direct reading permanent record of both inclination and direction, and after the instrument has been run in the well the chart 25 is removed and a new chart is placed in the instrument for taking a further record.

As was previously discussed, an important object of this invention is to provide a construction which will protect pivot 70 from shock damage and wear, so that it may provide substantially frictionless support for the indicating head 24. This is accomplished by providing means to support head 24 in a position spaced from pivot 70 at all times except during a very short time interval of the recording cycle in which the orientation of head 24 is accomplished.

The means for supporting head 24 takes the form of a holding member or sleeve 80 which surrounds pivot 70 and is slidably mounted in a suitable bearing 81 fitted within flange 51 of case 50. In addition to being slidable relative to case 50, holding sleeve 80 is slidable relative to pivot 70. The upper end of sleeve 80 is formed with a conical surface 82 shaped complemental to skirt surface 66 and adapted to seat tightly thereagainst. As can be understood, when sleeve 80 is engaged beneath skirt 64 in this manner the entire indicating head 24 may be lifted by upward movement of the sleeve so as to lift pivot seat 63 away from pivot 70.

Normally and in the initial position, head 24 is held away from pivot 70 in the position shown in Figures 2 and 3. This situation also obtains when the indicating head 24 is in the marking position shown in Figure 5, although as will be noted the position of sleeve 80 and of pivot 70 relative to case 50 is different from the initial position. With head 24 away from pivot 70 the delicate tip of the pivot as well as the pivot seat 63 is fully protected against damage. Any shocks to case 50 or indicating head 24 are transmitted through the seating and holding surfaces 66 and 82 which are not easily damaged.

In order to prevent indicating head 24 from being dislodged from the top of operating assembly 26, pivot 70 is provided with a semi-ball shaped flange 83 below the tip of the pivot which is adapted to seat against socket surface 67. Engagement between flange 83 and surface 67 limits the upward movement of head 24 so that it can be moved only a short distance away from pivot 70. At the same time, downward movement of pivot 70 relative to sleeve 80 is also limited.

The operating mechanism of the instrument can best be understood by considering first the different time phases which occur during the operating cycle and as are shown in the successive steps of Figures 3 through 5. In the starting or initial position shown in Figure 3, head 24 is spaced above pivot 70 and is supported by sleeve 80 in a position spaced below marking pin 47. The elements remain in this position during a predetermined time interval which is selected to be of a duration sufficiently long to allow the instrument to be lowered from the surface to the bottom of the well bore and to assume a rest position in which pendulum assembly 23 is not oscillating. During the succeeding phase as is shown in Figure 4, sleeve 80 is moved away from head 24 so that the head is supported for free rotation upon pivot 70. In this position, head 24 is rotated under the influence of magnet 65 and chart 25 is properly directionally oriented as has been described. Since the directional orientation of chart 25 requires only a very short time, the duration of the second phase is merely a matter of seconds.

Following the directional orientation of head 24, it is moved upwardly to engage the relatively inclined marking pin 47 upon chart 25 as is shown in Figure 5. This operation likewise requires only a very short time, and it is highly desirable that pin 47 should not remain engaged with chart 25 during the removal of the instrument from the well, so as to prevent any mutilation of the chart or shock damage to pendulum assembly 23. Therefore, the final phase of the operating cycle is to move head 24 and sleeve 80 back away from the position shown in Figure 5 to that shown in Figure 3, where they remain during the remainder of the time that the instrument is in the well and until resetting.

In connection with the phase shown in Figure 5, it should be noted that head 24 is spaced from pivot 70 upon engagement of pin 47 with chart 25. Pivot 70 is thus advantageously protected against the shock of impact of pin 47 upon chart 25 during recording. If desired, the operating phases for directionally orienting head 24 and engaging pin 47 with chart 25 may be repeated for a second or successive time. This serves as a check upon the accuracy of the record, for if all of the elements were properly at rest during recording, there should be but a single mark upon the record chart. If separate marks appear upon chart 25, one or more of the marks is necessarily inaccurate, and the record is disregarded and taken again.

As can be appreciated from the foregoing, the time required for positioning the instrument within the well bore is of considerably longer order than is the time required to complete the orienting and marking phases. Furthermore, the initial or positioning time interval is subject to variation for different well depths and conditions, while the time required for accomplishing the orienting and marking remains constant. For this reason, the instrument is provided with the previously mentioned main timing means 55, into which a variable predetermined positioning time interval may be set by means of the knob 53. In addition to the main timing means, the instrument provides a second timing means or control escapement which governs the operating means 56 through the various operating phases during a fixed and a much shorter time interval.

Both the timing means 55 and the control escapement are the same as those shown in the co-pending application of Arthur R. Barnett, et al., Serial Number 205,091, filed January 9, 1951, for Directional Inclination Recording Apparatus, now Patent No. 2,770,887, issued November 20, 1956, and reference is made thereto for complete description of these elements. In the use of the instrument the desired time interval is set into timing means 55 by rotation of knob 53 counterclockwise, as viewed in Figure 1. Knob 53 carries a series of radial graduations 90, which are calibrated in minutes, and the selected time interval is brought opposite a fixed mark 91 on panel 52 to cause an equal angular rotation of a transverse main setting shaft 92 to which knob 53 is affixed.

Mounted within case 50 is a front frame or plate 95, the outer face of which forms panel 52, and a spaced parallel back plate 96 to provide a framework for supporting timing means 55 and operating means 56. As is best seen in Figure 2, setting shaft 92 extends transverse through frames 95 and 96 and is rotatably journaled therein. Encircling the rear portion of shaft 92 is a coiled main spring 97 which is confined within a cover or housing 98 mounted on plate 96. One end of spring 97 is secured to shaft 92 and the other end is suitably connected to plate 96 so that the spring is tensioned or wound by rotation of the shaft. Upon winding, spring 97 immediately commences to drive shaft 92 in the clockwise direction back to the initial position.

A ratchet clutch 100 is mounted on shaft 92 for engaging with the timing escapement during the unwinding of spring 97 to regulate rotational movement of the shaft back to the zero position. The clutch 100 is formed as a disc having a pair of overhanging spring pawls 101 and 102 mounted on the periphery thereof to engage with a ratchet toothed gear 103 as is best seen in detail of Figure 7. During setting, when shaft 92 is rotated to wind spring 97 the pawls 101 and 102 slide over gear 103 and no motion is transmitted to the escapement.

The timing means 55 includes a gear 104 which is mounted on shaft 92 for rotation with clutch gear 103 and is engaged with a gear train 105. Gear train 105 is in turn connected to a conventional escapement (not shown) which controls the speed of rotation of the gear train in the usual manner. It can thus be seen that the timing means 55 acts to control the unwinding rotation of shaft 92 so that the shaft is only rotated back to the initial or zero position after the passage of the desired time interval for positioning the instrument within the well bore.

Rotation of shaft 92, under the urging of spring 97, causes rotation of a generally circular timing cam 110, which may be considered as forming the first element of the operating means 56. Cam 110 is mounted on shaft 92, and when it rotates to the initial or zero position, permits oscillating movement of an escapement lever 111 which rides thereon. As is best seen in Figure 7, the escapement lever 111 is part of a control escapement 112 which regulates operating means 56 through the phases of orientation and recording as were previously described.

Control escapement regulates the rotation of an upper transverse shaft 114 which extends rotatably through plates 95 and 96 and is connected to the previously mentioned knob 54. Shaft 114 is connected at its rear end to a spring 115 mounted in a cover 116 secured to plate 96. Rotation of knob 54 in a clockwise direction as viewed in Figure 1 winds spring 115 so that it tends to rotate shaft 114 in a counterclockwise direction back to the zero or initial position. This latter rotation of shaft 114 is regulated by escapement 112 and takes place slowly during a time in which the orienting and marking phases of the operating cycle occur.

The escapement 112 as is best seen in Figure 7 includes a reduction gear train 118 which is meshed with a gear 119 affixed to shaft 114. Escapement lever 111 is pivotally mounted on a shaft 120 and carries a pair of spaced pins or pallets 121 which mesh with a conventional ratchet-toothed escapement wheel 122 that is in turn connected to gear train 118. The pallets 121 regulate the rotation of wheel 122 in response to the oscillations of lever 111.

On the lower end of lever 111 is a follower pin 123 which rides on the periphery of timing cam 110. So long as pin 123 is following the surface of cam 110 lever 111 is held from oscillation, escapement wheel 122 cannot rotate, gear train 118 is locked, and upper shaft 114 is held from rotation. To allow rotation of shaft 114, a large notch 124 is cut in the surface of cam 110 at the zero position and comes into alignment with pin 123 when the cam and shaft 92 have rotated from the set position back to the initial or zero position. This occurs after the passage of the preselected time interval set into the instrument to allow for its positioning within the well bore. Follower 123 may then rock in and out of notch 124 to permit oscillation of lever 111. At this time shaft 114 commences to rotate slowly under the urging of spring 115 and the control of escapement 112.

Shaft 114 will rotate through the number of turns which spring 115 has been wound. If it is desired to provide an instrument which will mark twice, spring 115 is arranged so that shaft 114 may be rotated in a winding direction through two full turns. Upon each single revolution of shaft 114 back towards the starting position, the operating mechanism will cause indicating head 124 to be released from holding sleeve 80, directionally oriented, engaged with marking pin 47, and returned to a position secured upon the holding sleeve in the sequence as was previously described.

The mechanism for accomplishing this sequential movement includes a circular disc-shaped cam 130 which is affixed to shaft 114 and carries an eccentrically positioned operating pin 131 thereon mounted for free pivotal movement upon a shaft 132, as is best seen in the detail of Figure 4A. Operating pin 131 is of elongated shape having flat top and bottom sides and rounded end portions so that it is adapted for horizontal sliding movement as well as pivotal movement. Mounted for vertical sliding movement within case 50 is a crosshead or yoke 134 which is formed as a flat plate having a central vertical slot 135 of a size to fit around shaft 114 and an intersecting horizontal slot 136 adapted to slidably receive pin 131. Yoke 134 is positioned at the side of cam 130, as is best seen in Figure 2, with the latter extending along a longitudinal medial plane through the instrument and directly under the bottom of pivot 70.

As was previously mentioned, pivot 70 is slidable relative to holding sleeve 80 and it is urged downwardly relative thereto by a coil spring 138 which is fitted within an enlarged bore 139 formed in the sleeve. The lower end of spring 138 is confined by an outwardly projecting head 140 formed on the bottom end of pivot 70. It should be noted that head 140 is in vertical alignment with both cam 130 and the yoke 134. In addition to slots 135 and 136, yoke 134 is formed with an upper central opening 141 of rectangular shape which is open at the bottom into vertical slot 135 and is partially closed at the top by a pair of ears or lugs 142 which project inwardly a short distance. The lugs 142 are adapted to engage within a groove 143 formed in the bottom of holding sleeve 80 while pivot head 140 is confined for limited motion within opening 141.

The operational movement may best be understood by tracing the relative position of the parts as they progress through the phases shown in Figures 3 through 5. At the starting position operating pin 131 occupies a position at one side of horizontal groove 136 and shaft 114 is near the center of vertical groove 135. Pivot head 140 is moved downwardly to the bottom end of opening 141 under the urging of spring 138, and the upper end of pivot 70 is spaced away from seat 63. Pivot head 140 is also seated on the top of cam 130 in this position. Indicating head 24 is supported on the top of holding sleeve 80 in a position spaced away from marking pin 47. The holding sleeve 80 is held in its desired position by the engagement of lugs 142 within groove 143 and ball 83 is seated within socket 67. In this condition it can be seen that indicating head 24 is held quite firmly and at the same time pivot 70 is fully protected from shock damage.

When escapement 112 releases shaft 114 for rotation the shaft commences to rotate slowly in a clockwise direction turning cam 130 and causing pin 131 to move downwardly and inwardly along groove 136. The downward motion of pin 131 forces yoke 134 to move downwardly, and this in turn pulls sleeve 80 downwardly away from head 24. When pin 131 has rotated through a quarter turn, the parts have moved into the position shown in Figure 4. While yoke 134 has moved downwardly, pivot 70 could not move downwardly because of the engagement of head 140 upon cam 130 and has thus moved relatively to the top of opening 141. Since sleeve 80 has moved downwardly, head 24 is now supported on pivot 70 for free turning motion. This is the orienting phase of the operating cycle, and as was previously described, head 24 is directionally oriented by magnets 65.

As shaft 114 continues to rotate, pin 131 moves upwardly to the side opposite its starting position in the next quarter turn, and head 24 is again seated upon holding sleeve 80. This position is not shown in the drawings, but as can be understood, all of the upper parts have the same position as shown in Figure 3, and the only difference is that pin 131 would be on the other side of slot 136. By this time, directional orientation of head 24 has been completed, and as it again engages sleeve 80 the head is firmly seated and held frictionally against further rotation.

Upon completing three-quarters of a turn of shaft 114 pin 131 has moved to the position shown in Figure 5. Pin 131 has now forced yoke 134 to move upwardly relative to shaft 114. Sleeve 80 has been correspondingly moved upwardly to lift head 24 into engagement with marking pin 47. Pivot 70 has also been carried upwardly by yoke 134, but the spring 139 holds head 140 downwardly against the bottom of opening 141 so that the pivot remains spaced away from pivot seat 63. The pivot 70 is thus fully protected against the shock of impact of pin 47 upon chart 25. Pin 47, of course, impresses a mark upon chart 25 and this mark provides a record of both the inclination and directional azimuth of the well bore.

After shaft 114 has completed one full turn, pin 131 has moved back from the position shown in Figure 5 to that shown in Figure 3 and all of the elements have resumed the starting position. The second full turn of shaft 114 to make the check record on chart 25 merely repeats the operational phases as have been described in connection with the first revolution of the shaft. Upon coming to rest after the second revolution shaft 114 is in the position shown in Figure 3 and as has been explained, pivot 70 is fully protected against damage. All of the operating parts remain in this position during the recovery of the instrument from the well, and it may thus be fully understood that pivot 70 is protected from damage at all times except during the very short time interval when it is in use.

While I have described in some detail a preferred embodiment of the invention, it will be understood that modification of design and construction can be made without departing from the principles of the invention. Therefore, I do not wish to be restricted except as defined in the appended claims.

I claim:

1. In a well survey instrument adapted to be dropped within a well bore; a pivot; an indicateing member formed to be supported on said pivot for free movement; holding means movable from a position engaged with said indicating member and holding said member away from said pivot to a position disengaged from said member; and time-controlled means operatively connected to said holding means for moving said holding means from said engaged position to said disengaged position after the passage of a predetermined time interval and returning said holding means to said engaged position after a succeeding time interval.

2. In a well survey instrument adapted to be dropped within a well bore; a pivot; an azimuth indicating member formed to be seated on said pivot for free turning movement; a holding sleeve surrounding said pivot and movable from an upper position engaged with said indicating member and holding said member away from said pivot to a position disengaged from said member; and time-controlled means operatively connected to said holding sleeve for moving said holding sleeve from said engaged position to said disengaged position after the passage of a predetermined time interval and returning said holding sleeve to said engaged position after a succeeding time interval.

3. In a well survey instrument adapted to be dropped within a well bore; an upstanding vertical pivot; an indicating member formed to be supported on said pivot for free movement; a holding sleeve surrounding said pivot and movable vertically relative thereto from an upper position engaged with said indicating member and holding said member away from said pivot to a lower position disengaged from said member; operating means for moving said sleeve from said engaged position to said disengaged position and returning to said engaged position; and timing means operatively associated with said operating means and preventing the release thereof until the lapse of a predetermined time.

4. An instrument for surveying well bores which includes: an elongated housing; pendulum means suspended in said housing; a pivot mounted in said housing and spaced from said pendulum means; an indicating head having a seat adapted to be supported on said pivot, said head being formed to hold a compass chart thereon and having magnetic means for orienting said head in azimuth; a holding member positioned adjacent said pivot and movable vertically relative thereto from a position engaged with said head and holding said head away from said pivot to a position disengaged from said head; means for moving said holding member from said engaged position to said disengaged position and returning said member to said engaged position after said head is oriented in azimuth; and means for moving said head to engage said compass chart against said pendulum means after said holding means have been returned to the engaged position.

5. An instrument for surveying well bores which includes: an elongated housing; pendulum means suspended in said housing; a pivot mounted in said housing and spaced from said pendulum means; an indicating head having a seat adapted to be supported on said pivot, said head being formed to hold a compass chart thereon and having magnetic means for orienting said head in azimuth; a holding member positioned adjacent said pivot and movable vertically relative thereto from a position engaged with said head and holding said head away from said pivot to a position disengaged from said head; and time-controlled means for moving said holding member from said engaged position to said disengaged position and returning said member to said engaged position after said head is oriented in azimuth and thereafter moving said member and said head together to engage said compass chart against said pendulum means for marking thereon the azimuthal direction and inclination of said well bore.

6. An instrument for surveying well bores which includes: an elongated housing; pendulum means suspended in said housing; an upstanding pivot mounted in said housing and spaced from said pendulum means; an indicating head having a seat adapted to be supported on said pivot, said head being formed to hold a compass chart thereon and having magnetic means for orienting said head in azimuth; a holding member surrounding said pivot and movable vertically relative thereto from an upper position engaged with said head and holding said head away from said pivot to a lower position disengaged from said head; and time-controlled means for moving said holding member from said engaged position to said disengaged position and returning said member to said engaged position after said head is oriented in azimuth and thereafter moving said member and said head together to engage said compass chart against said pendulum means for marking thereon the azimuthal direction and inclination of said well bore.

7. An instrument for surveying well bores which includes: an elongated housing; an upstanding pivot mounted in said housing; an indicating head having a seat adapted to be supported on said pivot, said head being formed to hold a compass chart thereon and having magnetic means for orienting said head in azimuth; a holding member positioned adjacent said pivot and movable vertically relative thereto from a position engaged with said head and holding said head away from said pivot to a position disengaged from said head; and time-controlled means for moving said holding member from said engaged position to said disengaged position and returning said member to said engaged position after said head is oriented in azimuth.

8. An instrument for surveying well bores which includes: an elongated housing; an upstanding pivot mounted in said housing; an indicating head having a seat adapted to be supported on said pivot, said head being formed to hold a compass chart thereon and having magnetic means for orienting said head in azimuth; marking means mounted in said housing and spaced above said head; a holding member positioned adjacent said pivot and movable vertically relative thereto from a position engaged with said head and holding said head away from said pivot to a position disengaged from said head; and time-controlled means for moving said holding member from said engaged position to said disengaged position and returning said member to said engaged position after said head is oriented in azimuth and thereafter moving said member and said head together to engage said compass chart against said marking means.

9. An instrument for surveying well bores which includes: an elongated housing; an upstanding pivot mounted in said housing; an indicating head having a seat adapted to be supported on said pivot, said head being formed to hold a compass chart therein and having magnetic means for orienting said head in azimuth; a holding sleeve surrounding said pivot and movable vertically relative thereto, said sleeve being formed on its upper end to engage and rigidly support said head and being movable from a position engaged with said head and holding said head away from said pivot to a position disengaged from said head; spring means in said sleeve engaged with said pivot and urging said pivot away from said head; and operating means for moving said holding sleeve from said engaged position to said disengaged position and for returning said sleeve to said engaged position after said head is oriented in azimuth, said spring means yielding when said sleeve is moved to said disengaged position and returning said pivot away from said head when said sleeve returns to said engaged position.

10. An instrument for surveying well bores which includes: an elongated housing; an upstanding pivot mounted in said housing; an indicating head having a seat adapted to be supported on said pivot, said head being formed to hold a compass chart thereon and having magnetic means for orienting said head in azimuth; marking means mounted in said housing and spaced above said head; a holding sleeve surrounding said pivot and movable vertically relative thereto, said sleeve being formed on its upper end to engage and rigidly support said head and being movable from a position engaged with said head and holding said head away from said pivot to a position disengaged from said head; spring means in said sleeve engaged with said pivot and urging said pivot away from said head; operating means for moving said holding sleeve from said engaged position to said disengaged position and for returning said sleeve to said engaged position after said head is oriented in azimuth, said spring means yielding when said sleeve is moved to said disengaged position and returning said pivot away from said head when said sleeve returns to said engaged position, said operating means thereafter moving said sleeve and said head together to engage said compass chart against said marking means; and timing means operatively associated with said operating means and preventing the release thereof until the lapse of a predetermined time.

11. An instrument for surveying well bores which includes: an elongated housing; pendulum means suspended in said housing and carrying marking means thereon; an upstanding pivot mounted in said housing and spaced from said pendulum means; an indicating head having a seat adapted to be supported on said pivot, said head being formed to hold a compass chart thereon and having magnetic means for orienting said head in azimuth; a holding sleeve surrounding said pivot and movable vertically relative thereto, said sleeve being formed on its upper end to engage and rigidly supported said head and being movable from a position engaged with said head and holding said head away from said pivot to a position disengaged from said head; spring means in said sleeve engaged with said pivot and urging said pivot away from said head; operating means for moving said holding sleeve from said engaged position to said disengaged position and for returning said sleeve to said engaged position after said head is oriented in azimuth, said spring means yielding when said sleeve is moved to said disengaged position and returning said pivot away from said head when said sleeve returns to said engaged position, said operating means thereafter moving said sleeve and said head together to engage said compass chart against said marking means; and timing means operatively associated with said operating means and preventing the release thereof until the lapse of a predetermined time.

12. An instrument for surveying well bores which includes: an elongated housing; pendulum means suspended in said housing; an upstanding pivot mounted in said housing and spaced from said pendulum means; an indicating head having a seat adapted to be supported on said pivot, said head being formed to hold a compass chart thereon and having magnetic means for orienting said head in azimuth; a holding member surrounding said pivot and movable vertically relative thereto from an upper position engaged with said head and holding said head away from said pivot to a lower position disengaged from said head; a rotatable cam having an eccentric operating pin thereon and positioned beneath said pivot; a yoke slidably mounted below said pivot and said holding member adjacent said cam and having a horizontal slot for receiving said pin, a vertically enlarged opening receiving the bottom end of said pivot, and a positive connection with said holding member, said cam being rotatable to reciprocate said yoke to move said holding member to said disengaged position and to support said head on said pivot and thereafter return said member to said engaged position and lift said member and said head together to engage said compass chart against said pendulum means; a control escapement for controlling the rotation of said cam over an operating time interval; and timing means to release said control escapement after the lapse of a predetermined time interval for positioning said instrument within said well bore.

13. An instrument for surveying well bores which includes: an elongated housing; pendulum means suspended in said housing and carrying marking means thereon; an upstanding pivot mounted in said housing and spaced from said pendulum means; an indicating head having a seat adapted to be supported on said pivot, said head being formed to hold a compass chart thereon and having magnetic means for orienting said head in azimuth; a holding member surrounding said pivot and movable vertically relative thereto from an upper position engaged with said head and holding said head away from said pivot to a lower position disengaged from said head; a rotatable cam having an eccentric operating pin thereon and positioned beneath said pivot; a yoke slidably mounted below said pivot and said holding member adjacent said cam and having a horizontal slot for receiving said pin, a vertically enlarged opening receiving the bottom end of said pivot, and a positive connection with said holding member, said cam being rotatable to reciprocate said yoke to move said holding member to said disengaged position and to support said head on said pivot and thereafter return said member to said engaged position and lift said member and said head together to engage said compass chart against said marking means; spring means in said holding member engaged with said pivot and urging said pivot to the bottom of said opening and yieldable when said member is moved to said disengaged position to move said pivot relatively upwardly for engagement with said head; a control escapement for controlling the rotation of said cam over an operating time interval; and timing means to release said control escapement after the lapse of a predetermined time interval for positioning said instrument within said well bore.

14. An instrument for surveying well bores which includes: an elongated housing; pendulum means suspended in said housing; a pivot mounted in said housing and spaced from said pendulum means; an indicating head having a seat adapted to be supported on said pivot, said head being formed to hold a compass chart thereon and having magnetic means for orienting said head in azimuth; a holding member positioned adjacent said pivot and movable vertically relative thereto from a position engaged with said head and holding said head away from said pivot to a position disengaged from said head; and time-controlled means for moving said holding member from said engaged position to said disengaged position and returning said member to said engaged position after said head is oriented in azimuth and thereafter moving said member and said head together to engage said compass chart against said pendulum means for marking thereon the azimuthal direction and inclination of said well bore and disengaging said head from said pendulum means.

15. An instrument for surveying well bores which includes: an elongated housing; pendulum means suspended in said housing and carrying marking means thereon; an upstanding pivot mounted in said housing and spaced from said pendulum means; an indicating head having a seat adapted to be supported on said pivot, said head being formed to hold a compass chart thereon and having magnetic means for orienting said head in azimuth; a holding sleeve surrounding said pivot and movable vertically relative thereto, said sleeve being formed on its upper end to engage and rigidly support said head and being movable from a position engaged with said head and holding said head away from said pivot to a position disengaged from said head; spring means in said sleeve engaged with said pivot and urging said pivot away from said head; operating means for moving said holding sleeve from said engaged position to said disengaged position and for returning said sleeve to said engaged position after said head is oriented in azimuth, said spring means yielding when said sleeve is moved to said disengaged position and returning said pivot away from said head when said sleeve returns to said engaged position, said operating means thereafter moving said sleeve and said head together to engage said compass chart against said marking means and disengage said chart therefrom; and timing means operatively associated with said operating means and preventing the release thereof until the lapse of a predetermined time.

16. An instrument for surveying well bores which includes: an elongated housing; pendulum means suspended in said housing; an upstanding pivot mounted in said housing and spaced from said pendulum means; an indicating head having a seat adapted to be supported on said pivot, said head being formed to hold a compass chart thereon and having magnetic means for orienting said head in azimuth; a holding member surrounding said pivot and movable vertically relative thereto from an upper position engaged with said head and holding said head away from said pivot to a lower position disengaged from said head; a rotatable cam having an eccentric operating pin thereon and positioned beneath said pivot; a yoke slidably mounted below said pivot and said holding member adjacent said cam and having a horizontal slot for receiving said pin, a vertically enlarged opening receiving the bottom end of said pivot, and a positive connection with said holding member, said cam being rotatable to reciprocate said yoke to move said holding member to said disengaged position and support said head on said pivot and thereafter return said member to said engaged position and lift said member and said head together to engage said compass chart against said pendulum means and disengage said chart therefrom; and a control escapement for controlling the rotation of said cam over an operating time interval; and timing means to release said control escapement after the lapse of a predetermined time interval for positioning said instrument within said well bore.

References Cited in the file of this patent

UNITED STATES PATENTS

| | | |
|---|---|---|
| 2,479,377 | Lenzen et al. | Aug. 16, 1949 |
| 2,624,952 | MacLagan | Jan. 13, 1953 |
| 2,670,547 | Murata | Mar. 2, 1954 |
| 2,733,519 | Murata | Feb. 7, 1956 |